(12) United States Patent
Nishino et al.

(10) Patent No.: US 11,318,997 B2
(45) Date of Patent: May 3, 2022

(54) HOOD STRUCTURE

(71) Applicant: HONDA MOTOR CO., LTD., Tokyo (JP)

(72) Inventors: Masataka Nishino, Wako (JP); Shoya Murakami, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 15 days.

(21) Appl. No.: 16/823,960

(22) Filed: Mar. 19, 2020

(65) Prior Publication Data

US 2020/0307713 A1    Oct. 1, 2020

(30) Foreign Application Priority Data

Mar. 27, 2019   (JP) .............................. JP2019-059921

(51) Int. Cl.
   *B62D 25/10*    (2006.01)

(52) U.S. Cl.
   CPC .................... *B62D 25/10* (2013.01)

(58) Field of Classification Search
   CPC ....... B62D 25/10; B62D 25/12; B62D 25/105
   USPC ....................... 296/187.04, 193.11
   See application file for complete search history.

(56) References Cited

U.S. PATENT DOCUMENTS

| | | | | |
|---|---|---|---|---|
| 2013/0181484 A1* | 7/2013 | Grattan | ................. | B62D 25/105 296/193.11 |
| 2015/0054305 A1* | 2/2015 | Steinhilb | ................. | B60R 21/34 296/187.04 |
| 2017/0282977 A1* | 10/2017 | Kashima | ................. | B60R 21/34 |
| 2018/0072262 A1* | 3/2018 | Nakasako | ............... | B60R 21/34 |

FOREIGN PATENT DOCUMENTS

| | | | | |
|---|---|---|---|---|
| CN | 104512479 A | | 4/2015 | |
| CN | 104843082 A | * | 8/2015 | |
| CN | 108466656 A | * | 8/2018 | |
| EP | 2082948 A1 | * | 7/2009 | ........... B62D 25/105 |
| JP | 5120706 B2 | | 1/2013 | |
| WO | WO-2013087424 A1 | * | 6/2013 | ............. B60R 21/34 |
| WO | WO-2014207543 A1 | * | 12/2014 | ............. B62D 25/12 |
| WO | WO-2019150934 A1 | * | 8/2019 | ............. B62D 25/10 |

OTHER PUBLICATIONS

Machine language translation of CN 108466656 (Year: 2018).*
Machine language translation of EP 2082948 (Year: 2009).*
Office Action received in corresponding CN application No. 202010203419.2 dated Feb. 8, 2022 with English translation (13 pages).

* cited by examiner

*Primary Examiner* — D Glenn Dayoan
*Assistant Examiner* — Kevin P Weldon
(74) *Attorney, Agent, or Firm* — Rankin, Hill & Clark LLP (57) ABSTRACT

The present invention is intended to provide a hood structure to enhance capacity to absorb a collision energy. A hood member comprises a hood outer panel and a hood inner panel disposed on a back face of the hood outer panel. The hood inner panel comprises a general face portion disposed apart from the back face of the hood outer panel, a raised portion raised in a direction of the back face of the hood outer panel 4 from the general face portion and an opening portion formed in an upper face portion of the raised portion. In addition, the hood inner panel comprises a slit portion that extends across an edge line of the raised portion from the opening portion and is formed to slit an inclined face portion of the raised portion.

6 Claims, 9 Drawing Sheets

VII-VII

FIG. 8

VIII-VIII

FIG. 10

HOOD STRUCTURE

CROSS REFERENCE TO RELATED APPLICATIONS

This application claims the foreign priority benefit under 35 U.S.C. § 119 of Japanese Patent Application No. 2019-059921 filed on Mar. 27, 2019, the disclosure of which is incorporated herein by reference.

TECHNICAL FIELD OF THE INVENTION

The present invention relates to a hood structure.

BACKGROUND ART

Japanese Patent No. 5120706B2 discloses a hood structure comprising an outer panel and an inner panel including plural reinforcement bead portions arranged in a grid structure and projecting in an opposite direction to a direction toward the outer panel, a weight reducing hole bored through a flat portion surrounded by the reinforcement bead portions and a weight reducing flange formed around the weight reducing hole and disposed close to the outer panel. The outer panel is supported by plural sealant material portions that arranged into a gap on a back-side face of the outer panel. The weight reducing hole flange has cut-out portions from which the inner panel starts deforming when the outer panel from outside receives a large impact.

SUMMARY OF THE INVENTION

Since there is no cut-out portion formed on the raised portion (bead portion) projecting downward in the hood structure described above, there is a problem that desired collision energy cannot be absorbed because the raised portion hardly deforms. The present invention is intended to provide a hood structure to improve capability to absorb a collision energy The present invention has an aspect of a hood structure comprising a hood outer panel; and a hood inner panel disposed on a back face of the hood outer panel, wherein the hood inner panel comprising a general face portion positioned apart from the back face of the hood outer panel, a raised portion raised in a direction of the hood outer panel from the general face portion, an opening portion formed in an upper face portion of the raised portion and a slit portion extending across an edge line of the raised portion from the opening portion and further extending to slit an inclined face portion of the raised portion.

According to the present invention, the hood structure to improve capability to absorb collision energy is provided.

DETAILED DESCRIPTION OF THE INVENTION

An embodiment of the present invention is described below with reference to figures. Identical elements are given an identical sign and a redundant explanation is omitted. When a direction is indicated, one of front, rear, left, right, upper and lower directions from a passenger is indicated. In addition, "vehicle width direction" corresponds to "right-left direction".

Figure 1:
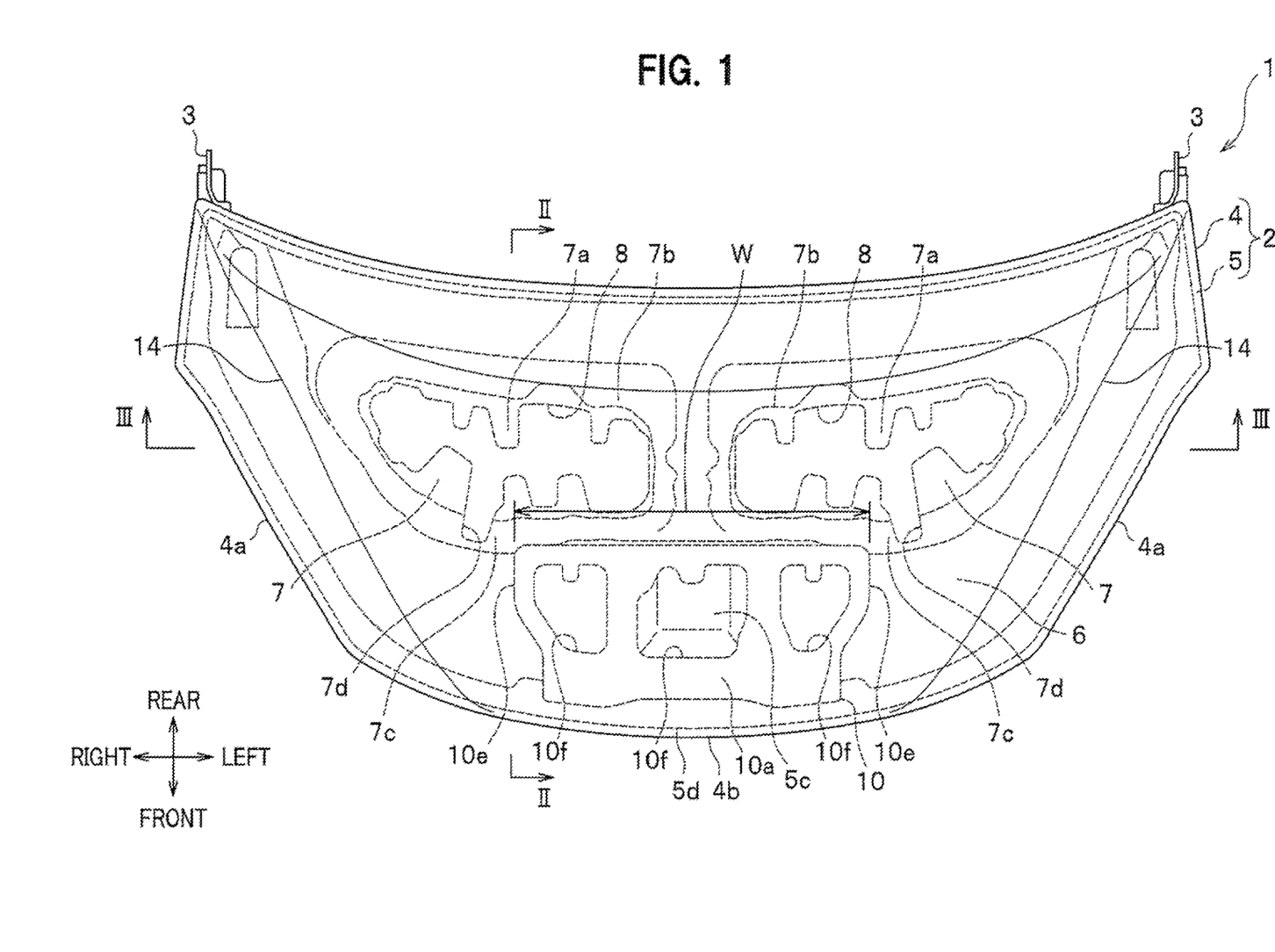
FIG. 1 is a plan view of a hood member viewed from above, which is to be used for a hood structure of an embodiment of the present invention.

FIG. 1 shows that a hood member 2, which covers an opening portion formed in an upper face of an engine room, is fitted to a vehicle 1 to which a hood structure of an embodiment of the present invention is applied.

The hood member 2 includes a hood outer panel 4 that is configured to pivot on hood hinges 3, 3 disposed at left and right rear end portions and constitutes a design face and a hood inner panel 5 joined to a back face of the hood outer panel 4.

The hood outer panel 4 is more or less in a trapezoidal shape when it is viewed from above and has a width dimension in the vehicle width direction that gradually decreases toward a front end of the vehicle.

The hood outer panel 4 has a ridge line 14 and a side edge portion 4a on each of right and left sides thereof. The ridge lines 14, 14 are portions projecting upward and extending from portions to which hood hinges are fitted to a front-end portion 4b of the hood outer panel 4. The hood outer panel 4 becomes lower extending outward in the vehicle width direction from the ridge lines 14 to the side edge portions 4a, 4a respectively on the left and right sides thereof.

The ridge lines 14 of the hood outer panel 4 are formed to protrude upward and extend respectively to a front edge portion 4b of the hood outer panel 4 from the portions where the hood hinges 3, 3 are fitted.

Figure 2:
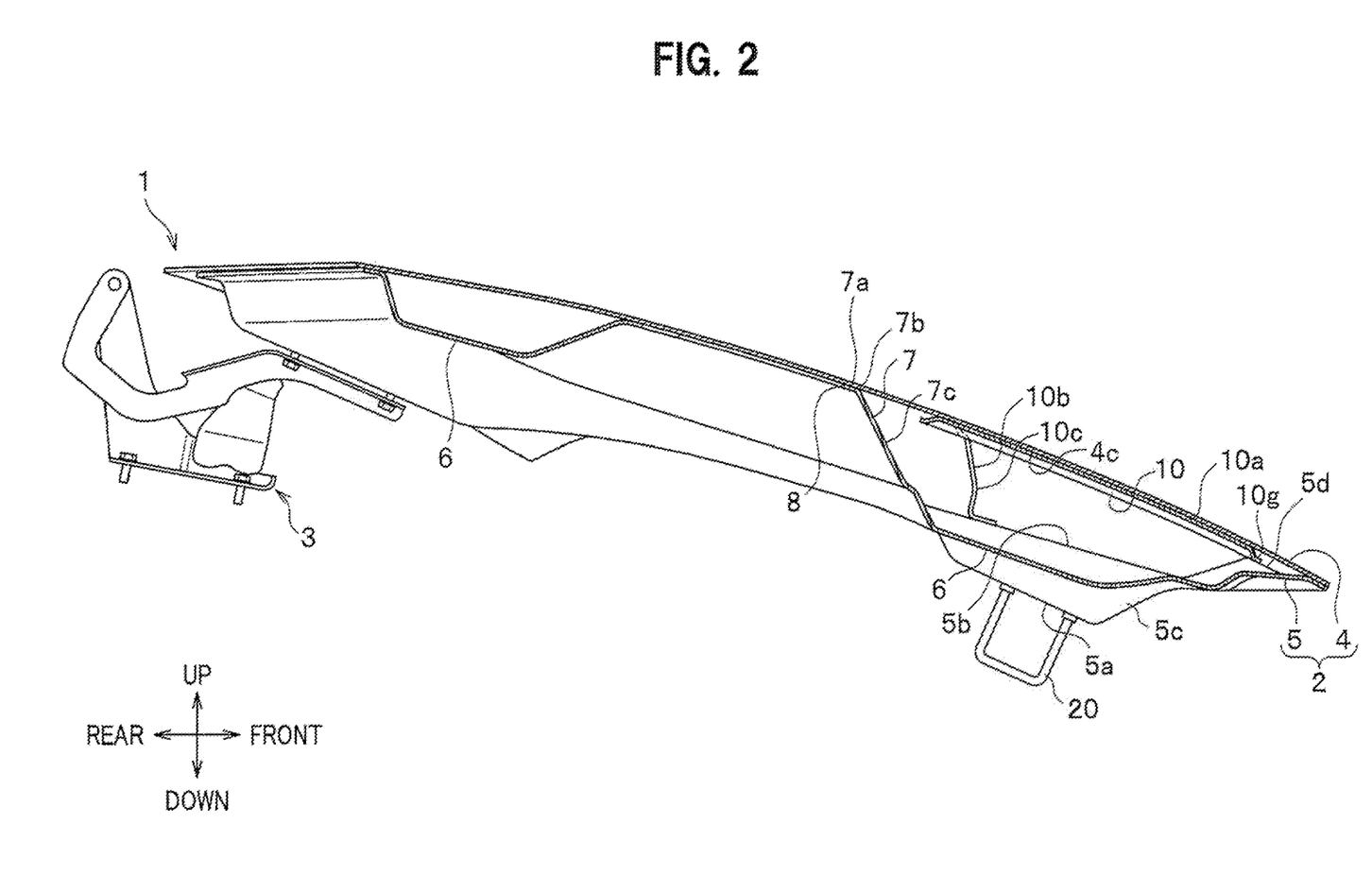
FIG. 2 is a cross-sectional view of the hood member of the embodiment along a line II-II indicated in FIG. 1.
Figure 3:
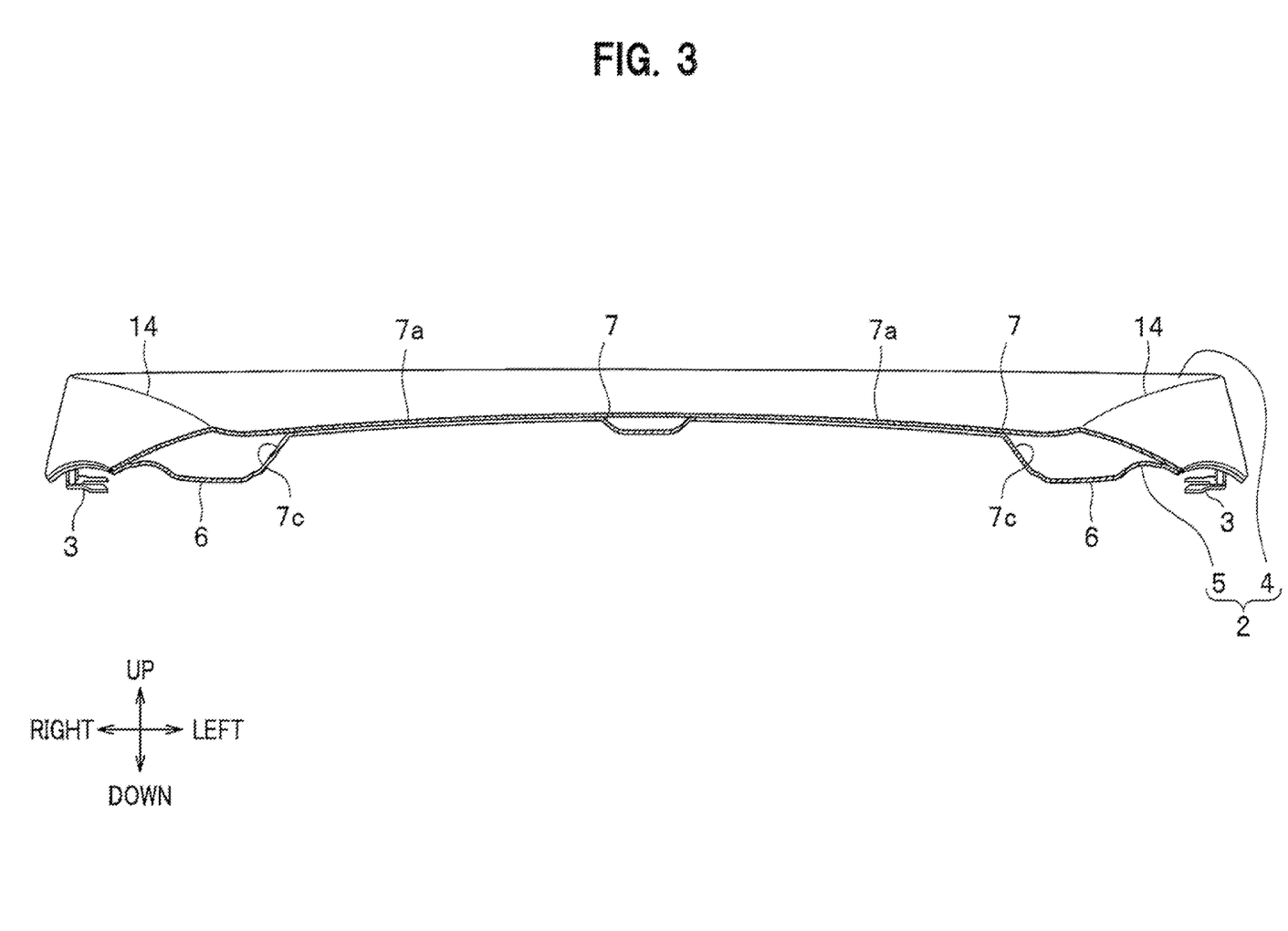
FIG. 3 is a cross-sectional view of the hood member of the embodiment along a line III-III indicated in FIG. 1.
Figure 4:
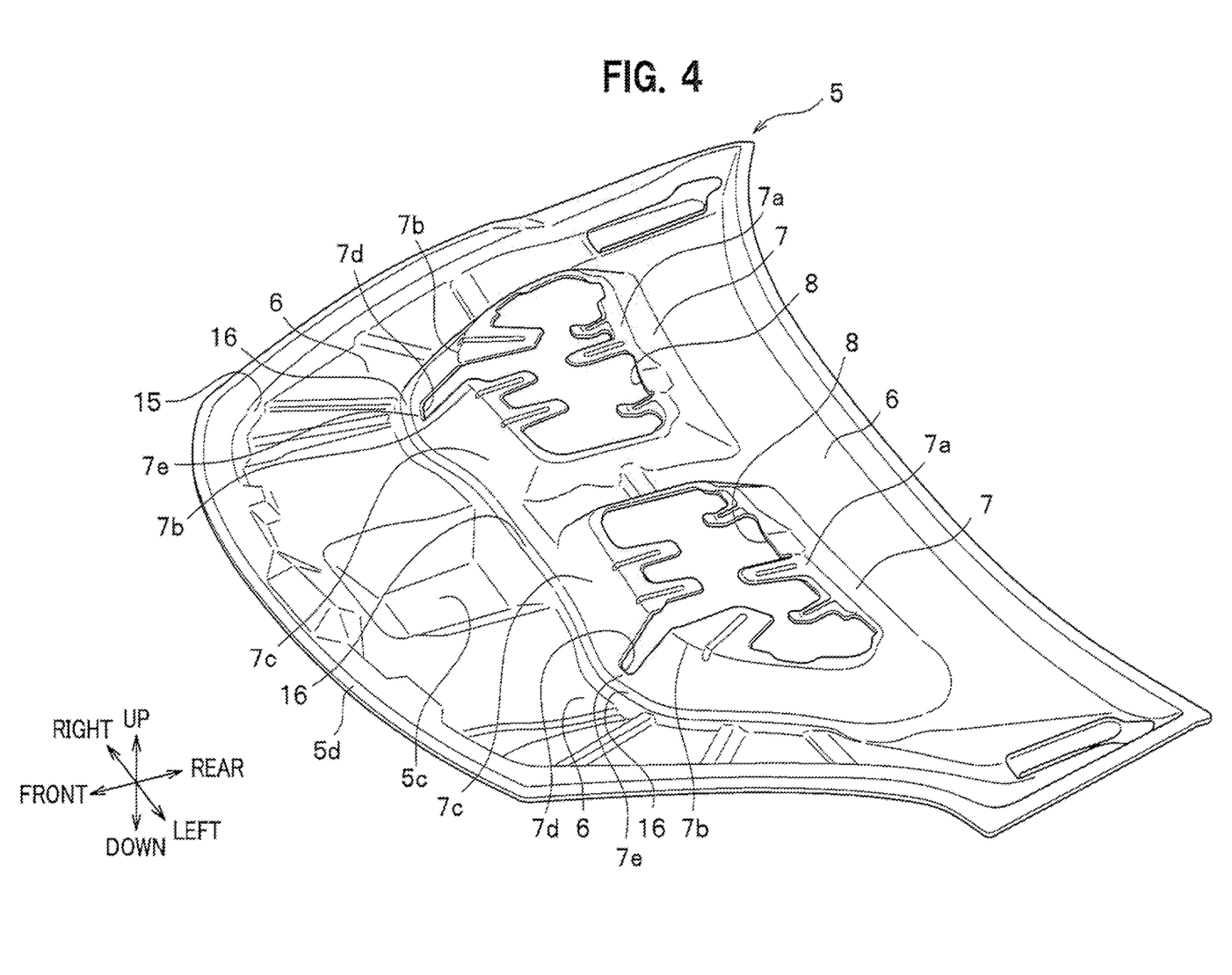
FIG. 4 is a perspective view of the hood member of the embodiment without a hood outer panel viewed diagonally from above to illustrate a configuration of a hood inner panel.

As seen in FIGS. 2 to 4, the hood inner panel 5 is a thin plate member that has a size as large as or a little smaller than an external shape of the hood outer panel 4 and is more or less in a trapezoidal shape in a plan view. The hood inner panel 5 includes a general face portion 6 that is disposed to be spaced apart from a back face of the hood outer panel 4.

There are plural raised portions and plural recessed portions both of which are formed in the general face portion 6 to be raised or recessed in an outer direction from the general face portion 6. Raised portions 7 are among these raised portions and have the largest area among them. The raised portions 7 are raised toward the hood outer panel 4 from the general face portion 6 and formed on both right and left sides of the hood inner panel 5. An upper face portion 7a of the raised portion 7 is supported by the back face of the hood outer panel 4 through sealant material.

The raised portion 7 includes an opening portion 8 formed in the upper face portion 7a and a slit portion 7d that extends from the opening portion 8 across an edge line 7b of the raised portion 7 and further extends to slit an inclined face portion 7c of the raised portion 7. The slit portion 7d of this embodiment has a constant width in its width direction that is vertical to a longitudinal direction of the slit portion 7d.

In addition, the slit portion 7d is a recessed portion between tongue portions 9a, 9b (See FIG. 6) and extends toward a low-end portion 7e. The slit portion 7d is formed to be a slit extending to a tip 7f short of the low-end portion 7e. The slit portion 7d extends to the tip 7f across a peripheral edge 8a of the opening portion 8 and the edge line 7b of the raised portion 7 of the hood inner panel 5. However, the slit portion 7d does not extend across a second step line 16 (See FIG. 5) of the low-end portion 7e to be described below and the tip 7f of the slit portion 7d is located short of the second step line 16.

In addition, there are a pair of the opening portions 8 formed symmetrically on the right and left sides of the hood inner panel 5. Each of the opening portions 8 has an elongate shape whose longitudinal direction is in parallel with the vehicle width direction and is formed to extend toward an outer side where the hood hinge 3 is disposed, curving and tapering with its width decreasing. There are plural tongue portions 9a to 9f formed on a peripheral edge 8a of the opening portion 8 and extending inward in the opening portion 8.

Figure 6:
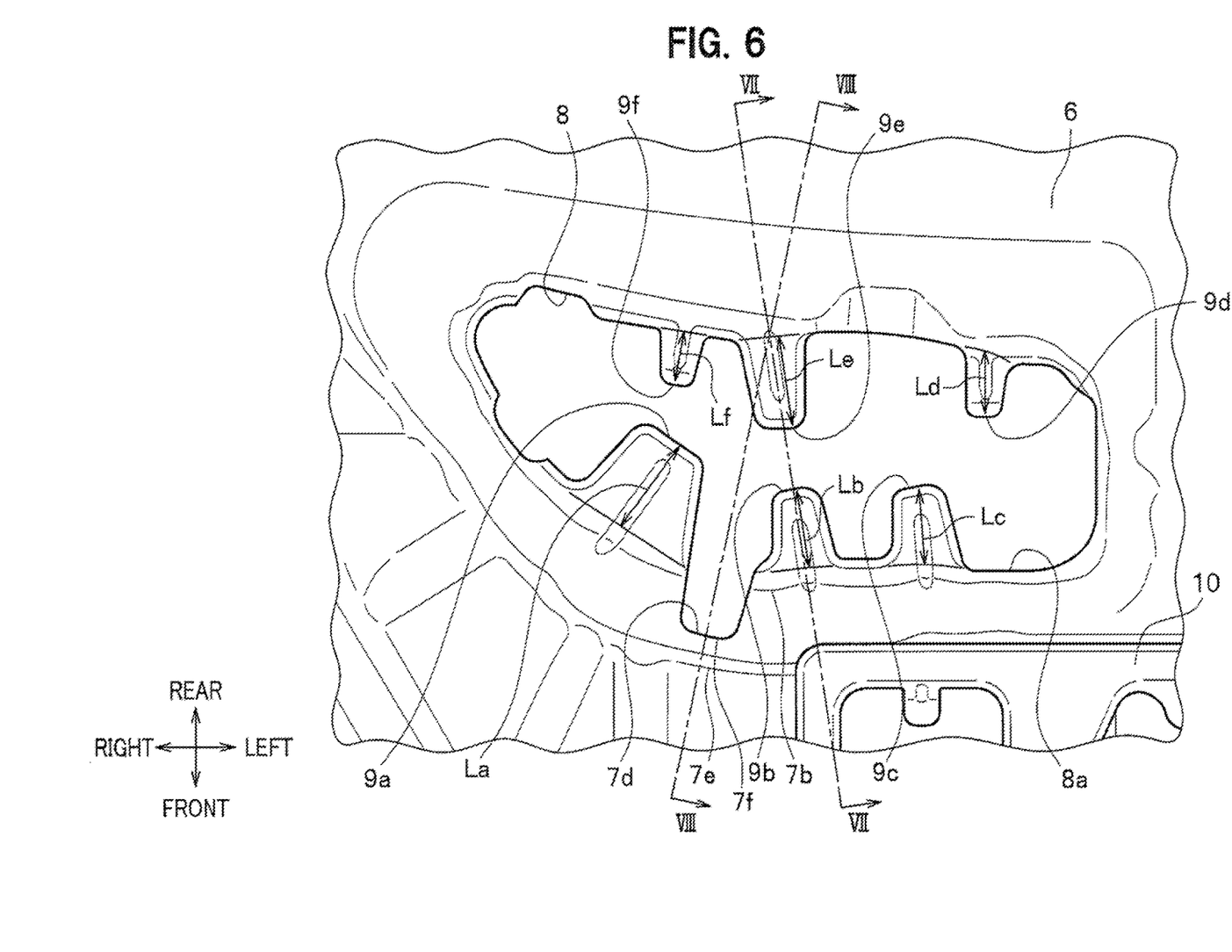
FIG. 6 is a plan view of a major portion of the hood inner panel of the embodiment.

As shown in FIG. 6, the tongue portions 9a to 9f may have respectively lengths La to Lf from the peripheral edge 8a to their tips, the lengths La to Lf differing from one another.

Figure 7:
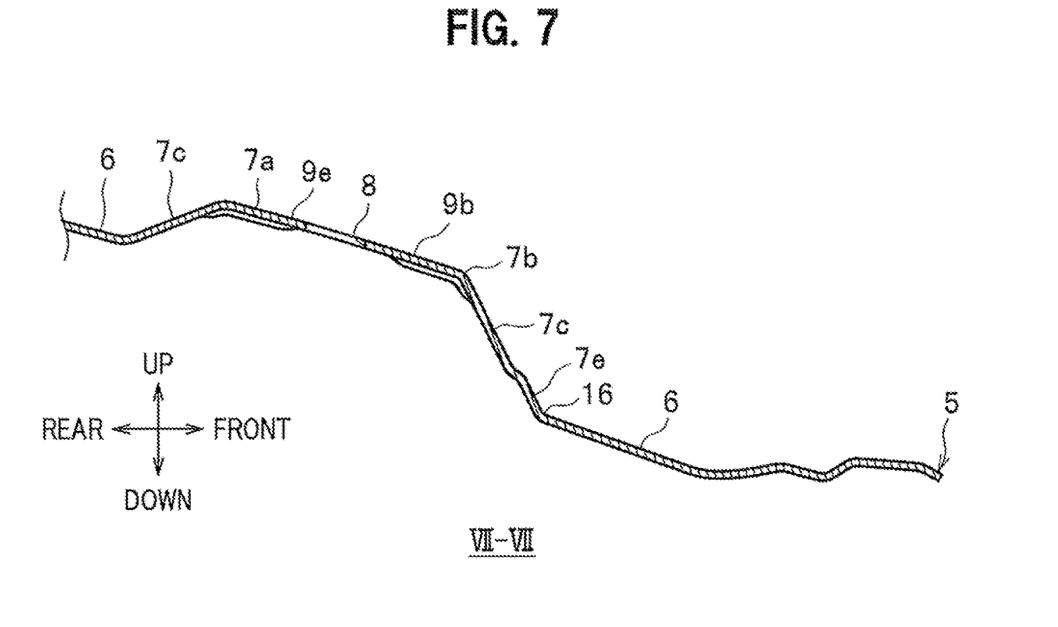
FIG. 7 is a cross-sectional view of the hood inner panel of the embodiment along a line VII-VII in FIG. 6.

As shown in FIG. 7, a portion in the opening portion 8 where the tongue portions 9e, 9b are disposed to project in the opening portion 8 has a relatively high body panel stiffness due to the opening portion 8 being narrower.

Figure 8:
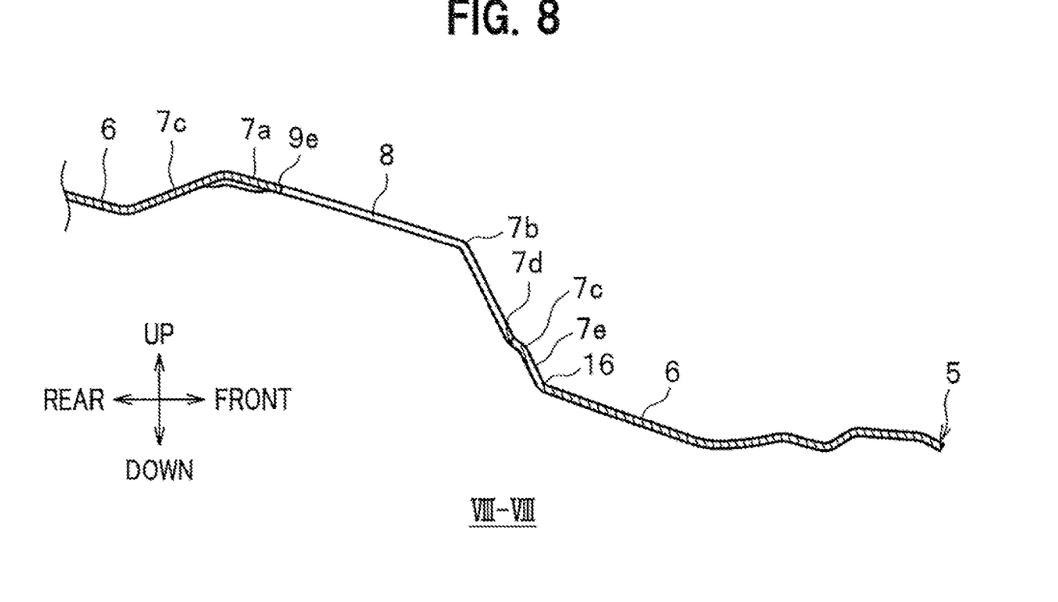
FIG. 8 is a cross-sectional view of the hood inner panel of the embodiment along a line VIII-VIII in FIG. 6.

As shown in FIG. 8, a portion including the slit portion 7d formed to extend from the opening portion 8 across the edge line 7b of the raised portion 7 and further extends to slit the inclined face portion 7c of the raised portion 7 and a portion including the tongue portion 9d or 9f having a relatively short length (Ld, Lf<La, Lb, Lc, Le) have relatively low body panel stiffnesses.

Accordingly, a desired body panel stiffness can be set on any portion of the raised portion 7 by having different lengths La to Lf to the tips of the tongue portions 9a to 9f. For example, it is possible to prevent the raised portion 7 from becoming hard to deform while keeping a sufficient body panel stiffness at a minimum number of portions to be required.

Figure 5:
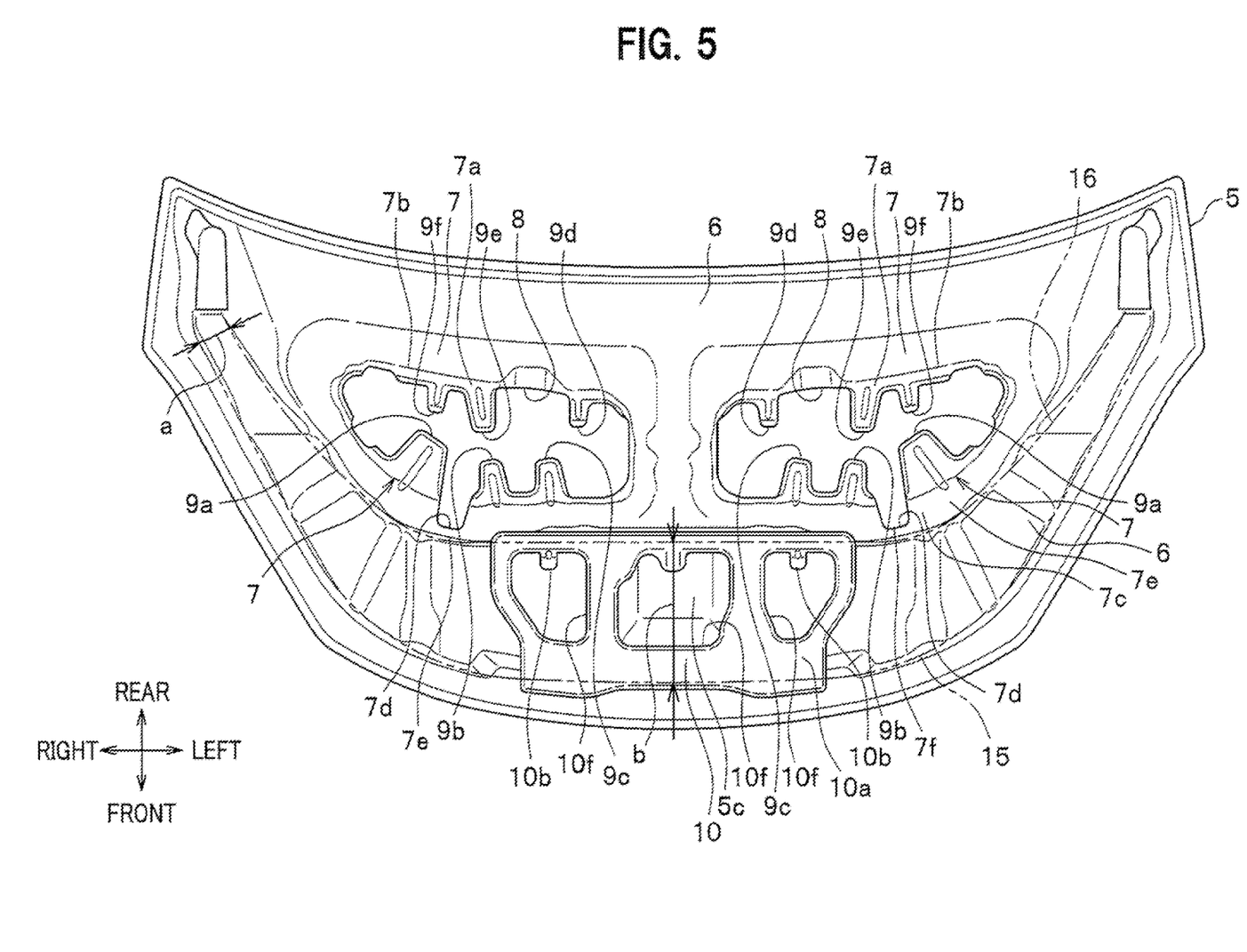
FIG. 5 is a plan view of the hood member of the embodiment to show how a bracket member is joined to the hood inner panel.

As shown in FIG. 4 and FIG. 5, the hood inner panel 5 of this embodiment has a front edge portion 5d disposed along the front edge portion 4b of the hood outer panel 4 (See FIG. 1). The front edge portion 5d is formed to be at a higher position than the general face portion 6. A first step line 15 extends between the front edge 5d and the general face portion 6. In addition, a second step line 16 extends along a lower edge of the low-end portion 7e of the raised portion 7 and between a front side of the low-end portion 7e and the general face portion 6.

A dimension of a length between the first step line 15 and the second step line 16 is set to become larger toward a center in the vehicle width direction of the hood inner panel 5. For example, when "a" denotes a dimension of a length between the first and second step lines 15, 16 at both right and left ends of the hood inner panel 5 and "b" denotes a dimension of a length between the first and second step lines 15, 16 at the center of the hood inner panel 5, the width becomes larger from the right and left ends of the hood inner panel 5 toward the center of the hood inner panel 5 (a<b).

The hood structure of this embodiment has a bracket member 10 disposed frontward in the vehicle front-rear direction of the raised portion 7 of the hood inner panel 5.

Figure 9:
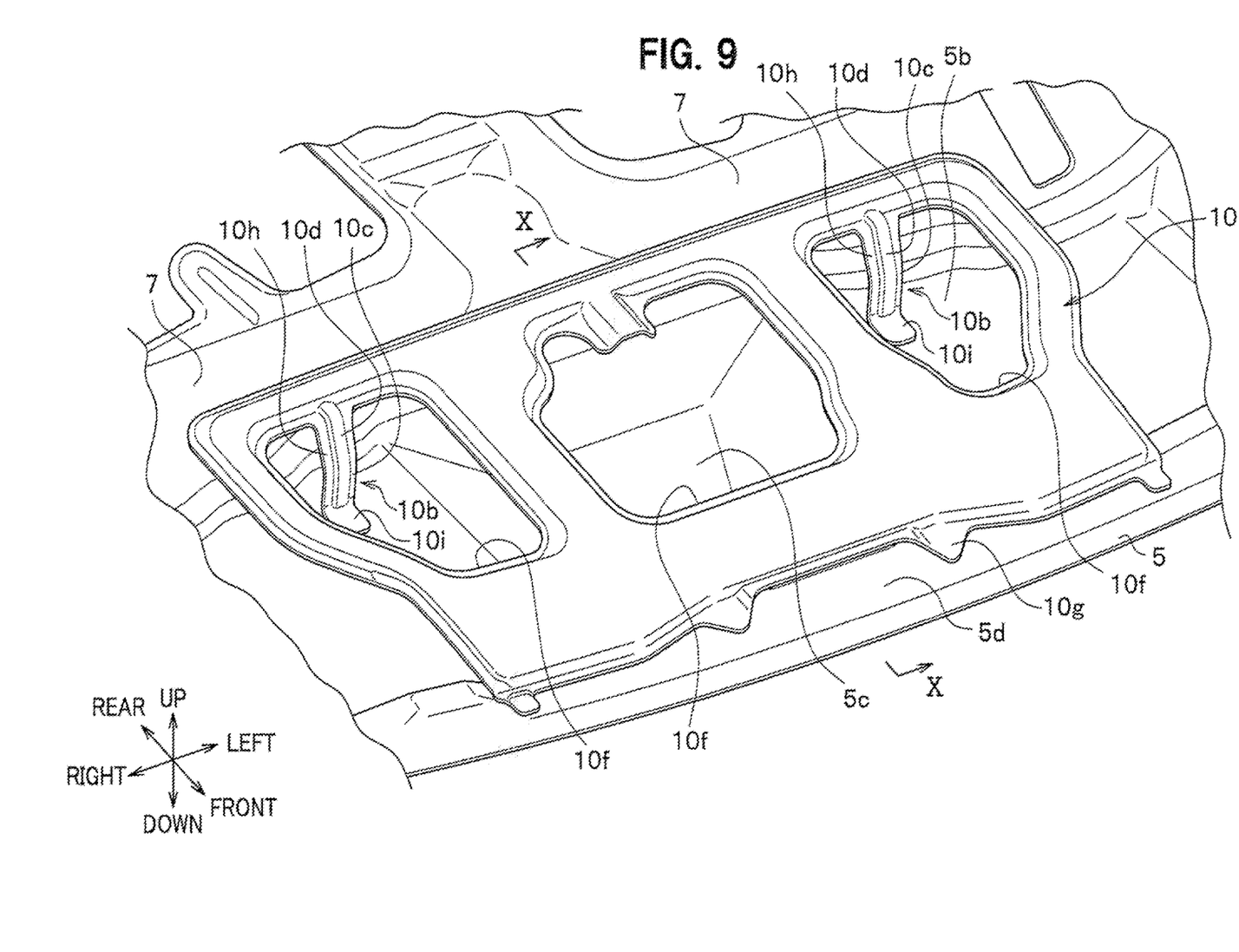
FIG. 9 is a perspective view of a portion of the hood member of the embodiment where the bracket member is joined to the hood inner panel.

As shown in FIG. 9, the bracket member 10 includes a top plate portion 10a in a plate-like shape joined to a back face 4c of the hood outer panel 4 and a pair of right and left joint portions 10b, 10b in a support leg shape joined to an front side face 5b of the hood inner panel 5. The top plate portion 10a includes plural weight reduction holes 10f formed to open.

Figure 10:
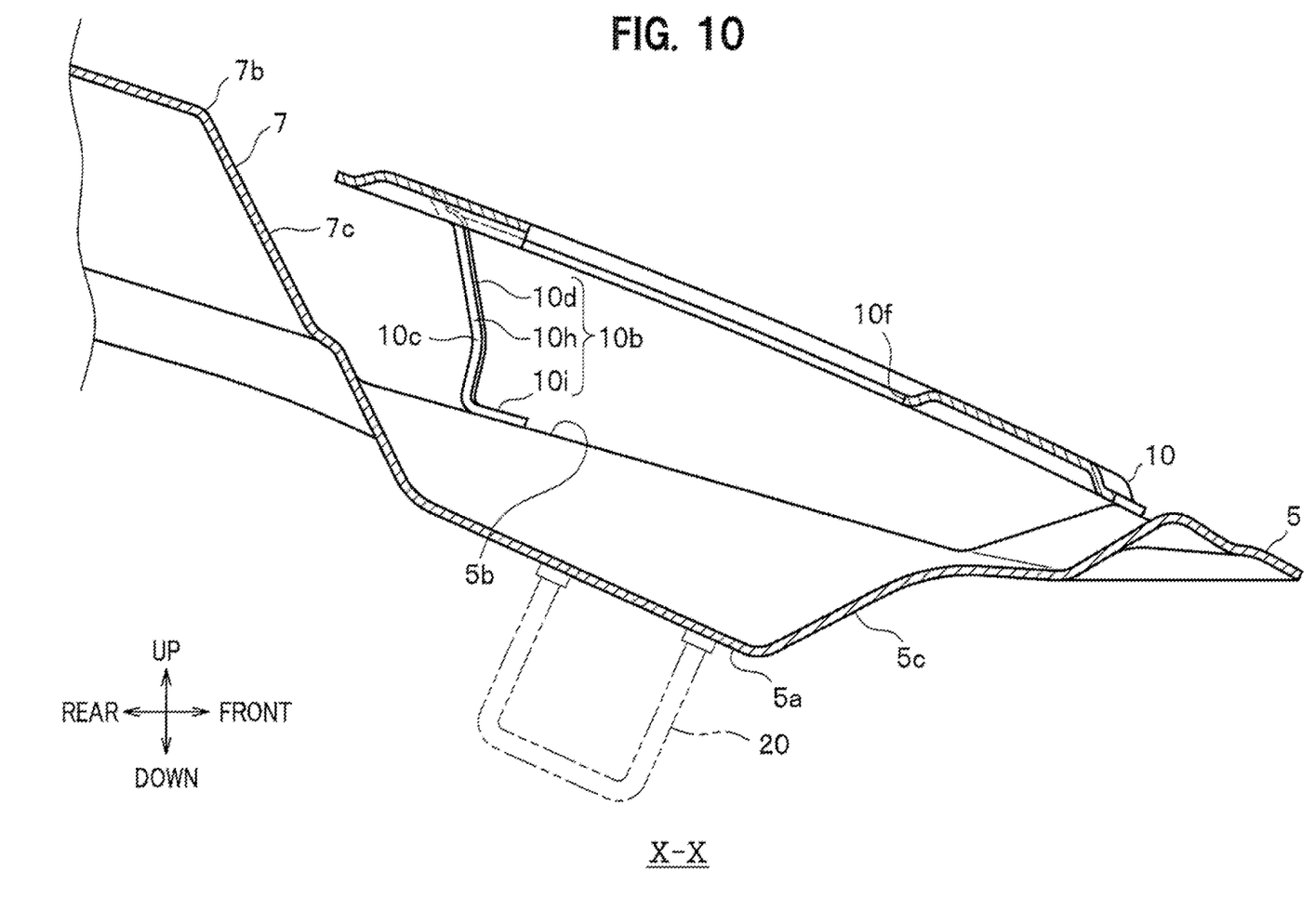
FIG. 10 is a cross-sectional view of the hood member of the embodiment along a line X-X in FIG. 9 showing how the bracket member is joined.

As shown in FIG. 10, the joint portion 10b includes a leg pillar portion 10h that is more or less in a shape of a letter L when it is viewed from its side, a joint face 10i joined to the front side face 5b and a bead 10d disposed along the leg pillar portion 10h in the upper and lower direction.

Further as shown in FIG. 10, the joint portion 10b includes a weak portion 10c that bends to be in a shape of a boomerang when it is viewed from its side and extends frontward in the vehicle front-rear direction inclining more downward. The weak portion 10c of this embodiment is formed to relatively easily bend at a bent portion thereof located more or less at a centre in the upper-lower direction of the leg pillar portion 10h, the bent portion being bent in advance.

As shown in FIG. 2, the bracket member 10 of this embodiment has a front edge 10g securely engaging with the front edge portion 5d of the hood inner panel 5 (See FIG. 9). The top plate portion 10a supported by the joint portion 10b is joined to the back face 4c of the hood outer panel 4. As a result, a part of the front side of the hood outer panel 4 is supported from under by the bracket member 10.

In addition, the pair of the right and left slit portions 7d, 7d are formed outward in the vehicle width direction of vehicle width direction outer end portions 10e, 10e of the bracket member 10, as shown in FIG. 1. That is, the slit portions 7d, 7d are not formed in an area W between the vehicle width direction outer end portions 10e, 10e.

Furthermore, a hood striker 20 is fitted below the bracket member 10 (See FIG. 10). The hood striker 20 is secured to a lower face 5a of a striker fixing portion 5c recessed downward and disposed at a center in the vehicle width direction of the hood inner panel 5.

Next, how the hood structure of this embodiment works is described.

As shown in FIG. 1, a vehicle 1 fitted with the hood structure of this embodiment comprises the hood member 2 inclusive of the hood outer panel 4 and the hood inner panel 5 disposed on the back face 4c of the hood outer panel 4.

As shown in FIG. 2, the hood inner panel 5 comprises the general face portion 6 disposed to be spaced apart from the back face 4c of the hood outer panel 4, a pair of raised portions 7 raised toward the hood outer panel 4 from the general face portion 6 and the opening portion 8 formed in the upper face portion 7a of the raised portion 7.

The hood inner panel 5 further comprises the slit portion 7d formed to extend across the edge line 7b of the raised portion 7 from the opening portion 8 and further extend to slit the inclined face portion 7c of the raised portion 7, as shown in FIG. 4.

The hood inner panel 5 of the embodiment has the slit portion 7d formed to extend toward the low-end portion 7e across the edge line 7b of the raised portion 7 from the opening portion 8 and further extend to slit the inclined face portion 7c of the raised portion 7. The slit portion 7d is formed to be in a shape of a deep groove having a constant width in its width direction that is vertical to a longitudinal direction of the slit portion 7d.

As a result, on a load being applied to the hood outer panel 4 when a vehicle is in collision with an obstacle, the raised portion 7 of the hood inner panel 5 disposed on a back side of the hood outer panel 4 easily deforms first at the slit portion 7d, which results in enhancing capability to absorb the collision energy.

As shown in FIG. 1 and FIG. 3, the hood outer panel 4 includes the ridge lines 14, 14 extending in the vehicle front-rear direction on both end portions in the vehicle width direction.

Between the ridge lines 14, 14, the raised portions 7, 7 and the slit portions 7d, 7d are formed.

According to the hood structure of the present embodiment, the raised portions 7, 7 and the slit portions 7d, 7d are formed inward in the vehicle width direction of the ridge lines 14, 14.

As a result, even when a portion of the hood outer panel 4 between the ridge lines 14, 14 collides with an obstacle, the raised portion 7 having the slit portion 7d can be made to easily deform. In addition, the ridge lines 14, 14 are formed to make the hood outer panel 4 in a raised shape, which can suppress a decrease in the body panel stiffness of the hood outer panel 4.

As shown in FIG. 5, the plural tongue portions 9a to 9f are formed to extend inward from the peripheral edge 8a of the opening portion 8 located in the upper face portion 7a of the raised portion 7. As shown in FIG. 6, the tongue portions 9a to 9f respectively have lengths La to Lf from the peripheral edge 8a of the opening portion 8, the lengths La to Lf differing from one another.

As a result, a desired body panel stiffness is set on any portion of the raised portion 7 by the plural tongue portions 9a to 9f. In addition, it is possible to prevent the raised portion 7 from becoming hard to deform while keeping a sufficient body panel stiffness at a minimum number of portions to be required.

As shown in FIG. 2, the hood member 2 of this embodiment further comprises the bracket member 10 disposed frontward in the vehicle front-rear direction of the raised portion 7 of the hood inner panel 5 and supporting the hood outer panel 4 from under.

As shown in FIG. 1, the pair of the right and left slit portions 7d, 7d are formed outward in the vehicle width direction of the vehicle width direction outer end portions 10e, 10e. That is, the slit portions 7d, 7d are not formed in an area W between the vehicle width direction outer end portions 10e, 10e.

As a result, the raised portion 7 can be easily deformed by the load applied to the hood inner panel 5 without being blocked from deforming by the bracket member 10.

Since the bracket member 7 is disposed frontward in the vehicle front-rear direction of the raised portion 7, the bracket member 7 comes in contact with and deforms the raised portion 7 when a collision energy is applied to a front portion of the vehicle, which contributes to absorption of the collision energy. Thus, the bracket member 10 deforms on its own, makes the raised portion 7 deform as well and functions for efficiently absorbing the collision energy.

As shown in FIG. 9 and FIG. 10, the bracket member 10 includes the joint portions 10b, 10b that are joined to the hood inner panel 5. The joint portions 10b, 10b respectively include the weak portions 10c, 10c that extend frontward in the vehicle front-rear direction inclining downward.

The weak portion 10c of this embodiment is more or less in a shape of a boomerang when it is viewed from its side and relatively easily bends at a portion thereof that has been bent. As a result, when a collision energy is applied to the bracket member 10, the weak portion 10c of the joint portion 10b deforms to bend and the bracket member 10 is easily displaced rearward to come in contact with the raised portion 7.

In addition, the joint portion 10b includes the leg pillar portion 10h that is more or less in a shape of a letter L and has the weak portion 10c interposed therein which functions as an origin of deformation to bend. As a result, although the bead 10d is formed on the leg pillar portion 10h to increase a stiffness of the leg pillar portion 10h, deformation of the leg pillar portion 10h can originate from the weak portion 10c having a lower stiffness and a desired portion can be easily made to deform.

As a result, when a collision energy is applied, the weak portion 10c of the joint portion 10b is reliably deformed to bend and the bracket member 10 is displaced toward the raised portion 7. Thus, the bracket member 10 reliably comes in contact with the raised portion 7, which leads to efficiently absorbing the collision energy.

As shown in FIG. 5, the hood inner panel 5 has the first step line 15 and the second step line 16.

Of these step lines, the first step line 15 extends along the front edge portion 4b of the hood outer panel 4 and between the general face portion 6 and the front edge portion 4b to connect the right and left hinges 3, 3.

On the other hand, the second step line 16 is positioned inside the first step line 15 and extends along the low-end portion 7e of the raised portion 7 and between the general face portion 6 and the low-end portion 7e to connect the right and left hinges 3, 3.

The dimension of the length between the first step line 15 and the second step line becomes larger from the right and left ends of the hood inner panel 5 toward the center in the vehicle width direction of the hood inner panel 5 (a<b).

The hood member 2 of this embodiment having a configuration as described has the general face portion 6 that is positioned between the first step line 15 and the second step line 16 and below the hood outer panel 4 and is spaced apart from the hood outer panel 4.

As a result, there is a space formed between the back face of the hood outer panel 4 and the general face portion 6 of the hood inner panel 5 (See FIG. 2). Accordingly, a deformation amount of the hood outer panel 4 when a load is applied to the hood outer panel 4 can increase.

The present invention should not be limited to the embodiment as described and should have various modifications. It should be noted that the embodiment as described is an example to easily understand the present invention and that the present invention should not be limited to the embodiment having the elements that have been described. In addition, an embodiment of the present invention made by removing an element of one embodiment of the present invention or replacing the element with other element of other embodiment of the present invention can be still included in the present invention. In addition, an embodiment made by adding an element of one embodiment of the present invention to other embodiment of the present invention is included in the present invention. Modifications to the embodiment as described are, for instance, as follows.

The hood structure of the embodiment as described comprises one slit portion 7d that extends across the edge line 7b of the raised portion 7 from the opening portion 8 and further extends to slit the inclined face portion 7c of the raised portion 7, as shown in FIG. 4. However, there may be plural, that is, more than one slit portions 7*d* formed in one raised portion 7.

In addition, the shape of the slit portion 7*d* is not limited to the shape as described and may be any shape as long as the slit portion 7*d* extends across the edge line 7*b* of the raised portion 7 from the opening portion 8 and is formed to slit the inclined face portion 7*c* of the raised portion 7. For example, the slit portion 7*d* of the embodiment may have a slit narrower than that as described.

In addition, the embodiment is not limited to an embodiment having a pair of right and left raised portions 7 and may have a single raised portion 7 or more than two raised portions 7. As far as the shape, the number and the position of the raised portion 7 are concerned, there should not be any limitation.

What is claimed:

1. A hood structure comprising:
   a hood outer panel; and
   a hood inner panel disposed on a back face of the hood outer panel,
   wherein the hood inner panel comprises:
   a general face portion positioned apart from the back face of the hood outer panel;
   a raised portion raised in a direction toward the hood outer panel from the general face portion;
   an opening formed in an upper face portion of the raised portion;
   a slit portion extending across an edge line of the raised portion from the opening to slit an inclined face portion of the raised portion; and
   a second step line which extends along a low end portion of the raised portion and between the general face portion and the low end portion,
   wherein the slit portion does not extend across the second step line.
   wherein the hood outer panel includes a ridge line extending in a vehicle front-rear direction in each of right and left end portions in a vehicle width direction, and the raised portion and the slit portion are arranged between the ridge lines.

2. The hood structure as claimed in claim 1, wherein plural tongue portions are formed to extend inward from a peripheral edge of the opening and have lengths from the peripheral edge that differs from one another.

3. The hood structure as claimed in claim 1 further comprising a bracket member disposed frontward in a vehicle front-rear direction of the raised portion of the hood inner panel and supporting the hood outer panel from under, wherein the slit portion is positioned outward in a vehicle width direction of a vehicle direction outer end portion of the bracket member.

4. The hood structure as claimed in claim 3, wherein the bracket member includes a joint portion that is joined to the hood inner panel and includes a weakened portion extending frontward in a vehicle front-rear direction and downward.

5. The hood structure as claimed in claim 1, wherein the hood inner panel has a first step line extending along a front edge portion of the hood outer panel and between the general face portion and the front edge portion, and wherein a dimension of a front-rear direction length between the first step line and the second step line becomes larger toward a center in the vehicle width direction of the hood inner panel.

6. A hood structure comprising:
   a hood outer panel; and
   a hood inner panel disposed on a back face of the hood outer panel, wherein the hood inner panel comprises:
   a general face portion positioned apart from the back face of the hood outer panel;
   a raised portion raised in a direction toward the hood outer panel from the general face portion;
   an opening formed in an upper face portion of the raised portion;
   a slit portion extending across an edge line of the raised portion from the opening to slit an inclined face portion of the raised portion; and
   a second step line which extends along a low end portion of the raised portion and between the general face portion and the low end portion,
   wherein the slit portion does not extend across the second step line, and
   wherein plural tongue portions are formed to extend inward from a peripheral edge of the opening and have lengths from the peripheral edge that differs from one another.

* * * * *